US008626655B2

(12) United States Patent
Akella et al.

(10) Patent No.: US 8,626,655 B2
(45) Date of Patent: *Jan. 7, 2014

(54) ELECTRONIC SYSTEM FOR SELECTING THE BEST CARD FROM A COLLECTION OF CONSUMER CREDIT, DEBIT AND DISCOUNT CARDS

(75) Inventors: Raji L. Akella, Austin, TX (US);
Marion Behnen, Austin, TX (US);
Guarav Jain, Santa Clara, CA (US);
James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,243

(22) Filed: May 9, 2012

(65) Prior Publication Data
US 2012/0221471 A1 Aug. 30, 2012

Related U.S. Application Data

(62) Division of application No. 11/936,111, filed on Nov. 7, 2007.

(51) Int. Cl.
*G06Q 40/00* (2012.01)
(52) U.S. Cl.
USPC .............................................. 705/40; 705/35
(58) Field of Classification Search
USPC ....................................................... 705/40, 35
See application file for complete search history.

(56) References Cited

U.S. PATENT DOCUMENTS

2006/0178986 A1* 8/2006 Giordano et al. ................ 705/40
2009/0018955 A1* 1/2009 Chen et al. ...................... 705/39

OTHER PUBLICATIONS

Eileen Ambrose; "Using the Right Credit Card Abroad can Save Money"; Daily Press; May 11, 2003.*
Pei, JianFeng; "E-commerce to boost purchasing card"; Purchasing; Oct. 5, 2000.*
Akella et al., Electronic System for Selecting the Best Card from a Collection of Consumer Credit, Debit and Discount Cards, U.S. Appl. No. 11/936,111, filed Nov. 2, 2007, Final Rejection dated Aug. 31, 2011.
Akella et al., Electronic System for Selecting the Best Card from a Collection of Consumer Credit, Debit and Discount Cards, U.S. Appl. No. 11/936,111, filed Nov. 2, 2007, Non-Final Rejection dated Mar. 2, 2011.

(Continued)

*Primary Examiner* — Edward Chang
(74) *Attorney, Agent, or Firm* — Yudell Isidore Ng Russell PLLC

(57) ABSTRACT

A method, system and computer program product for enabling completion of purchase transactions by retrieving purchase card information from an electronic database of consumer cards and applying the appropriate card to the transaction. The database, managed by a central card authority, stores client account information for cards such as debit, credit, phone, and discount cards, which are accessible via a unique, secure login/access credential, such as a username and password combination. During registration with the central card authority, a client classifies key/important factors to consider when performing purchases. The central card authority is accessed by the client during purchases from a retail facility and/or other purchasing environment. The central card authority automatically selects the best card to utilize during a purchase, after weighing the important purchasing factors related to the credit, debit, phone, and discount cards registered with the central card authority.

20 Claims, 8 Drawing Sheets

(56) References Cited

OTHER PUBLICATIONS

Akella et al., Electronic System for Selecting the Best Card from a Collection of Consumer Credit, Debit and Discount Cards, U.S. Appl. No. 11/936,111, filed Nov. 2, 2007, Restriction Requirement dated Apr. 1, 2010.

U.S. Appl. No. 11/936,111 entitled "Electronic System for Selecting the Best Card From a Collection of Consumer Credit, Debit, and Discount Cards"; Non-final office action dated Apr. 1, 2010 (4 pg).

U.S. Appl. No. 11/936,111 entitled "Electronic System for Selecting the Best Card From a Collection of Consumer Credit, Debit, and Discount Cards"; Non-final office action dated Mar. 2, 2011 (19 pg).

U.S. Appl. No. 11/936,111 entitled "Electronic System for Selecting the Best Card From a Collection of Consumer Credit, Debit, and Discount Cards"; Notice of Allowance dated Aug. 14, 2011 (13 pg).

\* cited by examiner

Consumer Card Selection 300

Customer Name: 302

Card 1: 304
Card 2: 304
Card 3: 304
Card 4: 304
Card 5: 304
Card 6: 304

User ID: 306
User Password: 308

*Please select preference of card usage.*
*Rank in order from GREATEST to LEAST important factors:*

Card Factors 330
Note: Greatest – 9, Least – 1

| 303 [8] | Checking Account Balance 330a | 303 [6] | Retail Store 330g |
| 303 [5] | Available Credit 330b | 303 [2] | Monthly Interest Rate 330h |
| 303 [4] | Annual Percentage Rate 330c | 303 [7] | Discounts Available 330i |
| 303 [9] | Credit Limit 330d | | |
| 303 [9] | Reward Points 330e | | |
| 303 [3] | Retail Environment 330f | | |

SAVE 313   EDIT 315   EXIT 317   HELP 319

FIG. 3

ELECTRONIC SYSTEM FOR SELECTING THE BEST CARD FROM A COLLECTION OF CONSUMER CREDIT, DEBIT AND DISCOUNT CARDS

PRIORITY CLAIM

The present application is a divisional of and claims priority from U.S. patent application Ser. No. 11/936,111, filed on Nov. 7, 2007, titled "Electronic System for Selecting the Best Card from a Collection of Consumer Credit, Debit and Discount Cards." The content of that application is incorporated by reference herein.

BACKGROUND

1. Technical Field

The present invention generally relates to computer systems and in particular to a computer system and associated electronic database for completing consumer transactions.

2. Description of the Related Art

Each day billions of dollars are spent in retail purchases. Department stores, gas stations, online retailers, and grocery stores are primary recipients of these consumer dollars. Recently, perhaps due to personal convenience, safety, and security, a large number of consumers have transitioned away from (or reduced) their use of cash to conduct retail purchases and have increased their use of credit cards and debit cards. Many of these consumers have and utilize multiple different cards in the various retail environments in which these cards may be utilized. These consumers must often juggle the large number of cards and indiscriminately select one card to utilize. Oftentimes, the consumer's selection of a particular card may be made with the consumer completely unaware of the annual percentage rate (APR), monthly interest rates, reward point accumulation, available credit, credit limit, and/or checking account balance (if using a debit card) associated with the card(s) being utilized. Credit cards vary in the interest rate and available credit. Inadvertently spending over the available credit limit or making major purchases with a high interest rate card may be detrimental to the consumer's credit rating or extremely costly in the near future.

In addition to the increased use of credit and debit cards, discount cards and/or store cards are often offered to attract consumers. When utilizing discount cards, the consumer may receive promotional prices, frequent shopper points, and/or coupons for future purchases. Discount cards, also known as shopping/store cards, are distributed by a range of stores such as cosmetic stores, pet stores, grocery stores, whole food stores, etc. Similar to credit cards, discount cards are often small, plastic cards issued by the retailer, and much like regular credit and debit cards, these discount cards are often utilized with the consumer being unaware of specific characteristics of the card, which may be helpful when determining whether or not to utilize the card to complete a retail transaction.

There are several problems associated with or that may arise from the use of credit, debit, and discount cards. For example, consumers typically carry a large number of their credit, debit, and discount cards with them, which makes for a cumbersome wallet/purse. Carrying multiple cards may increase the possibility that a consumer may utilize the wrong card leading to higher interest rates on purchases or perhaps a fee for going over the credit limit. Additionally, carrying credit cards and discount cards on one's person makes the cards more likely to be lost or stolen, providing an opportunity for person finding or stealing the card to make unauthorized purchases until the loss/theft is discovered and reported by the consumer. Further, once the loss/theft occurs, the consumer is left without a mechanism to make purchases, particularly when the consumer does not have any cash or access to a bank account. Also, carrying multiple cards may increase the chance of losing one of the cards without realizing that the card has been lost or misplaced. Again, when a card is misplaced or lost without the knowledge of the consumer, the card may be found and utilized by an unauthorized party.

SUMMARY OF ILLUSTRATIVE EMBODIMENTS

Disclosed are a method, system and computer program product for enabling completion of financial purchase transactions by retrieving purchase card information from an electronic database of consumer cards and applying the appropriate card to the transaction. The database, managed by a central card authority, stores client account information for cards such as debit, credit, phone, and discount cards, which are accessible via a unique, secure login/access credential, such as a username and password combination. During registration with the central card authority, a client (e.g., a card owner) classifies key/important factors to consider when performing purchases. The central card authority is accessed by the client during purchases from a retail facility and/or other purchasing environment (e.g., the Internet, doctor's office, movie theatre, etc.). The central card authority automatically selects the best card to utilize during a purchase, after weighing the important purchasing factors related to the credit, debit, phone, and discount cards registered with the central card authority.

In one embodiment, a consumer's credit, debit, and discount cards are registered with the central card authority. A questionnaire is completed, which allows the consumer to select the most important factors for consideration during credit card use, ranging from least importance to greatest importance. For instance, the consumer may select the credit card interest rate as the most important factor in card usage, while the consumer selects the accumulation of reward points as the least important factor in card usage.

In one embodiment, the consumer utilizes a form of identification (identification card, finger print, pin number, etc.) that is required to access the consumer database and retrieve card information from the database. The consumer database may exist on a server controlled by the central card authority. When completing a purchase transaction, the consumer submits the unique credential information as the consumer's identification to a local computer system, and the local computer system then retrieves the credit or debit card information from the central card authority server. A software application executing at the server automatically selects the best card for the purchase, according to information previously submitted.

In one embodiment, the consumer has the option of overriding the use of the card selected by the card authority. When the consumer is presented the "best" card for utilization during the purchase (in progress), the consumer may refuse to utilize the card and select a different purchasing card from the cards that have been previously registered with the central card authority. Each of the relevant cards (credit, debit, phone, discount, etc.) registered with the central card authority by the customer are displayed within a graphical user interface. The customer may then select from among the displayed cards, overriding the automatically selected purchasing card.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a graphical user interface for entering factors of importance in consumer card selection according to one embodiment of the invention;

DETAILED DESCRIPTION OF. AN ILLUSTRATIVE EMBODIMENT

Figure 1:
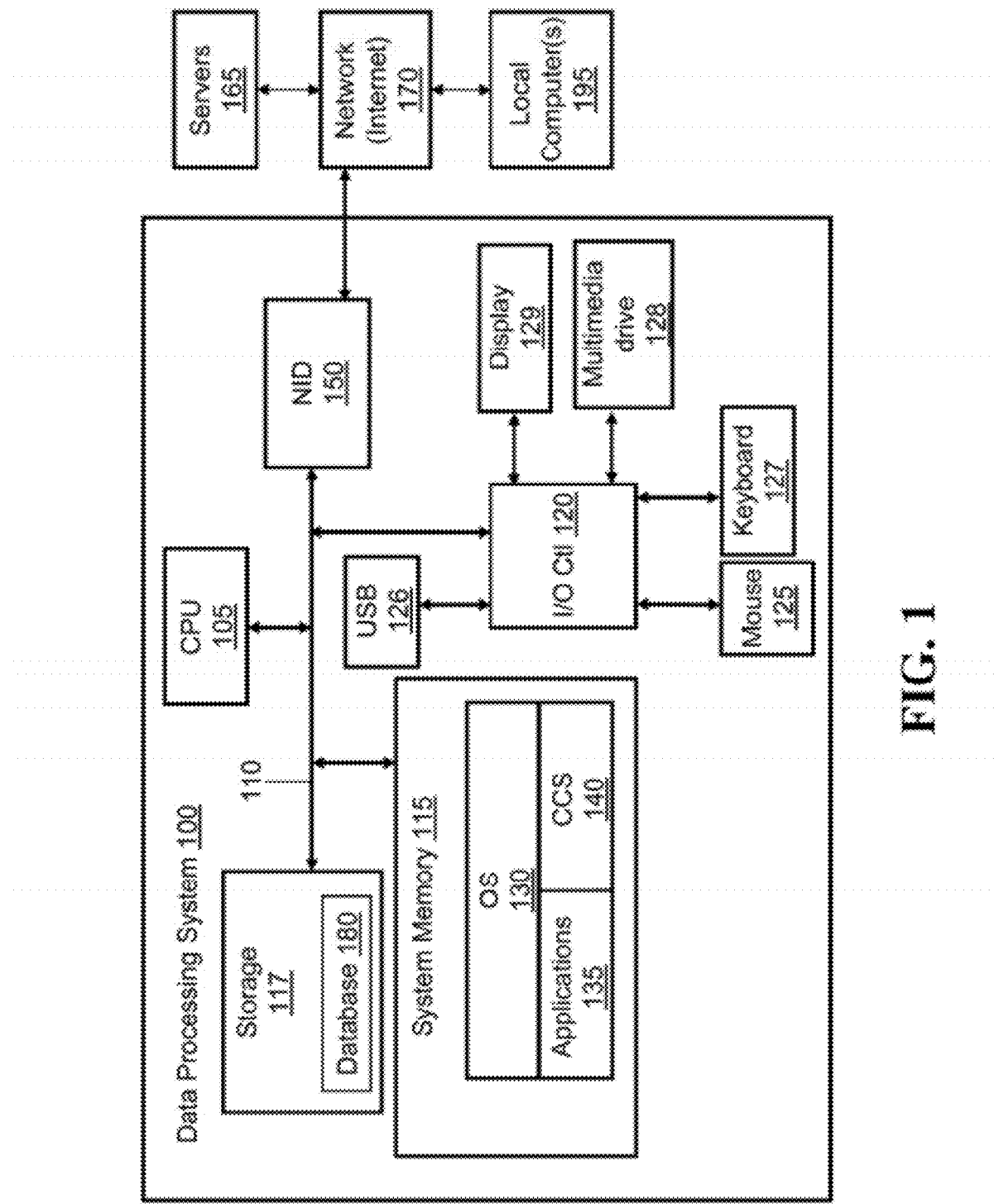
FIG. 1 is a block diagram of a data processing system according to one embodiment of the invention.

The illustrative embodiments provide a method, system and computer program product for enabling completion of financial purchase transactions by retrieving purchase card information from an electronic database of consumer cards and applying the appropriate card to the transaction. The database, managed by a central card authority, stores client account information for cards such as debit, credit, phone, and discount cards, which are accessible via a unique, secure login/access credential, such as a username and password combination. During registration with the central card authority, a client (e.g., a card owner) classifies key/important factors to consider when performing purchases. The central card authority is accessed by the client during purchases from a retail facility and/or other purchasing environment (e.g., the Internet, doctor's office, movie theatre, etc.). The central card authority automatically selects the best card to utilize during a purchase, after weighing the important purchasing factors related to the credit, debit, phone, and discount cards registered with the central card authority.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 depicts a block diagram representation of a data processing system (and connected network), which may provide the functionality of a central card authority or a client device utilized to access the central card authority, depending on the software being executed thereon. Data processing system (DPS) 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) hub 126 are illustrated, coupled to I/O controller 120. Multimedia drive 128 and USB hub 126 may operate as both input and output (storage) mechanisms.

DPS 100 also comprises storage 117, within which data/instructions/code may be stored. Database 180 is maintained within storage 117. In one embodiment, database 180 may be a separate device that is not associated with storage 117. DPS 100 is also illustrated with a network interface device (NID) 150, with which DPS 100 connects to one or more servers 165 or distributed client devices 195 via an access network 170, such as the Internet. Network 170 may provide connection to distributed client devices 195, which may be individual, location-fixed or portable computer devices utilized to register consumers to central card authority or manage consumer accounts hosted at the central card authority or access consumer information at the central card authority during a purchasing transaction.

In the described embodiments, network 170 may be a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within memory 115 are a number of software/firmware components, including operating system (OS) 130 (e.g., Microsoft Windows®, a trademark of Microsoft Corp, GNU®/Linux®, registered trademarks of the Free Software Foundation and The Linux Mark Institute, or Advanced Interactive Executive (AIX)®, a registered trademark of IBM), applications 135, and customer card selection (CCS) utility 140. In actual implementation, applications 135 and CCS utility 140 may be combined as a single application collectively providing the various functions of each individual software component when the corresponding code is executed by the CPU 105. For simplicity, CCS utility 140 is illustrated and described as a stand alone or separate software/firmware component, which provides specific functions, as described below.

CPU 105 executes CCS utility 140 as well as OS 130, which supports the user interface features of CCS utility 140. In the illustrative embodiment, CCS utility 140 generates/provides several graphical user interfaces (GUI) to enable user interaction with, or manipulation of, the functional features of the utility (140). Among the software code/instructions provided by CCS utility 140, and which are specific to the invention, are: (a) code for creating and maintaining a database (180) of consumer card information linked to a central card authority; (b) code for enabling consumer setup and/or update of user accounts with unique login credential data and relevant card selection information; (c) code for receiving requests for completing a financial transaction (e.g., purchasing) using the central card authority; (d) code for authenticating a customer and retrieving relevant customer information to select a best card for completing the financial transaction; (e) code for finalizing purchases utilizing the central card authority; (f) code for activating a distress-call response. For simplicity of the description, the collective body of code that enables these various features is referred to herein as CCS utility 140. According to the illustrative embodiment, when CPU 105 executes CCS utility 140, DPS 100 initiates a series of functional processes that enable the above functional features as well as additional features/functionality, which are described below within the description of FIGS. 2-8.

As further provided herein, certain features of the invention are implemented at a server-level central card authority that is accessed by local customer devices (such as in a retail establishment) via a network, such as the internet. These local customer devices support the user interface features by which the consumer interacts with the central card authority. Alternatively, in one embodiment, the central card authority is a local server or computer that displays a user interface that is generated by the local execution of CCS utility on the server/computer.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the AIX operating system or LINUX operating system.

Figure 2:
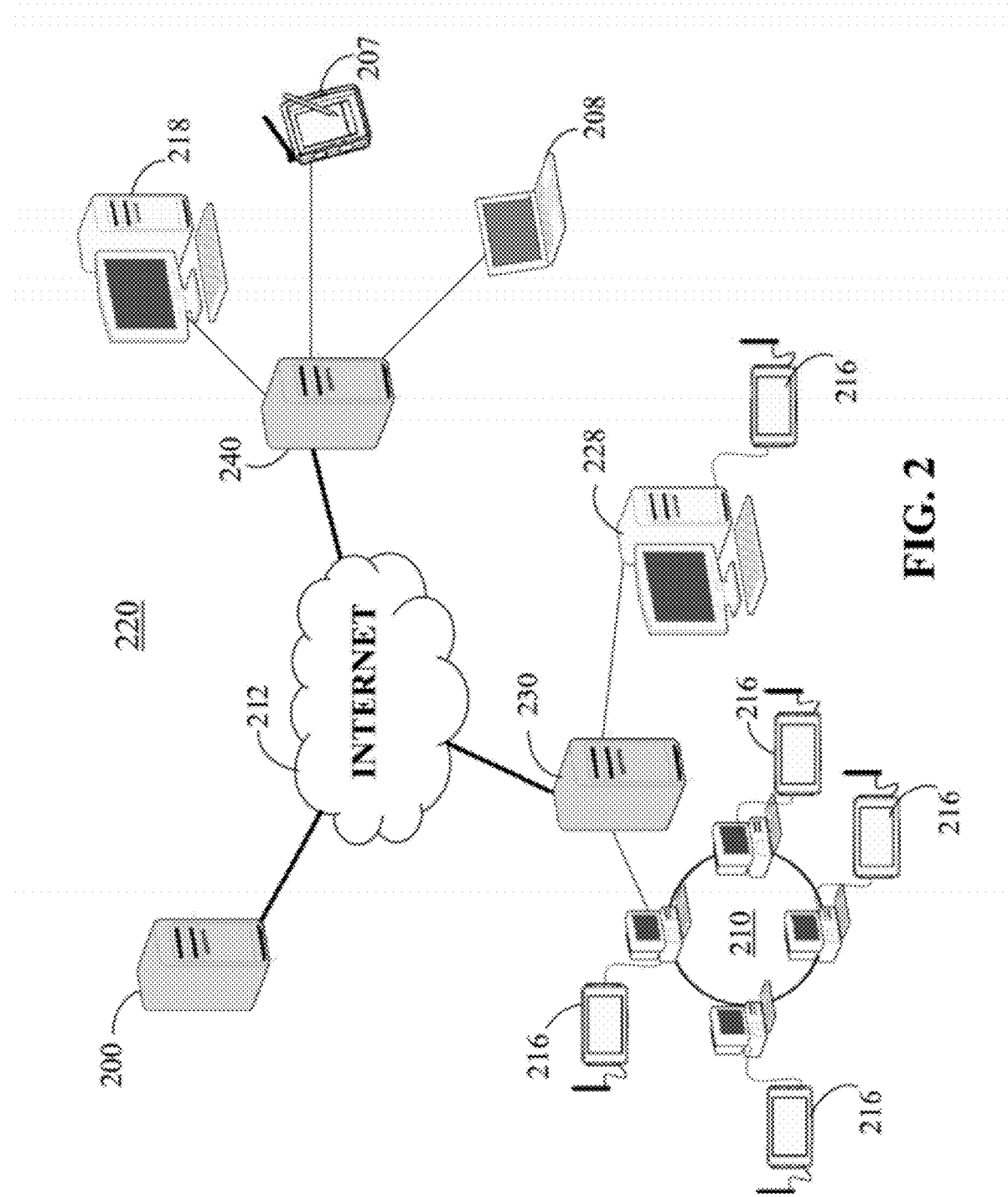
FIG. 2 is a diagram of a network of computers with an Internet linked server in accordance with one embodiment of the invention.

With reference now to FIG. 2, there is illustrated a network 220 having a plurality of network-connected servers, including central card authority server 200, retail server 230, and local server 240, each connected to Internet 212. Several distributed computer systems may exist in network 220, including client computer 218, client laptop 208, and retail computer 228, as well as network computers 210. Customer ID recognition unit 216 is linked to client computers 228 and network computers 210. Customer ID recognition unit 216 may be connected via an external connection point such as an application programming interface (API). The API permits a small hand held scanner (such as customer ID recognition unit 216) to be plugged in or wirelessly linked to client computers 228 and network computers 210. Network 220 also includes portable handheld computer 207, such as a Palm Pilot (manufactured by 3 Com) or a smart phone, which may be linked to local server 240. Customer ID recognition unit 216 may also be connected to a portable device, such as client laptop 208 and/or portable handheld computer 207.

In one embodiment, central card authority server 200 may exist at the credit card authority company site. At the credit card authority site, a computer, similar to DPS 100 (FIG. 1), is utilized to register consumers, and the consumer's credit card information is entered into a database (180). Database 180 of central card authority server 200 operates as the primary storage location for the database of the consumer's card information and other information utilized in selecting a best card for use in a particular environment.

Retail server 230 may retrieve information from central card authority server 200 via Internet 212 when requested by a customer. Retail server 230 is located within a retail environment, such as a department store, grocery store, etc., in which customers purchase items. Retail environments contain retail computer 228 and/or network computers 210, which are computerized purchasing registers. Retail computer 228 and network computers 210 may be equipped with customer ID recognition unit 216 for accessing a customer's credit, debit, phone, and/or discount card information or for triggering a distress call.

In one embodiment, a customer is identified utilizing customer ID recognition unit 216 connected to retail computer 228. Retail computer 228 receives the authorized credential (and/or identification) of the customer, such as a fingerprint, scan card, pin number, and identifier (ID) and password combination input, for example, obtained via customer ID recognition unit 216. The customer identification and/or credential is transmitted to retail server 230, and then forwarded to main network server (200). When the customer's identification is verified, the requested information is downloaded to retail server 230. A GUI is dynamically displayed on customer ID recognition unit 216. The GUI allows the customer to utilize the credit card (or other payment method) automatically selected by the credit card authority (i.e., CCS utility) or to select another card that is registered with the customer's identification in the central card authority database.

As illustrated, local server 240 may obtain access to central card authority server 200 via Internet 212. In one embodiment, client computer 218, client laptop 208, and/or portable handheld device 207 are utilized to access central card authority server 200 via local server 240 and Internet 212 to upload customer information. When shopping in a web-based retail environment, Internet 212 displays a secure website for purchasing items. A web browser GUI, provided by central card authority server 200 of the central card authority, is displayed. The customer may enter a form of identification and/or password to obtain access to the purchasing information on the database of central card authority server 200. Following validation of the entered identification, the customer gains access to the customer profile linked to the entered identification. A card, which is selected by the central card authority according to information provided by the customer (via a registration and update process described below), is displayed on customer ID recognition unit 216. The customer may then utilize the selected card, or override the automated selection, as described below.

FIG. 3 illustrates consumer card selection GUI 300. Consumer card selection GUI 300 allows a consumer to enter registration information for each of multiple cards and rank the most important factors in credit, debit, phone, and discount card usage. Prior to ranking the card factors, a consumer may register personal information. To enter personal information, consumer card selection GUI 300 comprises the fields of customer name entry 302, card account entries 304, user ID entry 306, and password entry 308. Consumer card selection GUI 300 also includes ranking number 303, which may be a drop down menu of numbers that link to specific, named card factors 330a-f. Card factors 330a-f are features of credit, debit, and/or phone cards to consider when deciding whether to utilize the particular card. When the factors have been ranked to the consumer's satisfaction, the consumer engages save 313 to store the results in the customer database. Additional selections are provided to the user within consumer card selection GUI 300. Edit 315 allows the consumer to revise any previously saved information. Help 319 may be engaged to further explain card factors 330, and exit 317 is utilized to close consumer card selection GUI 300 before and/or after saving.

In one embodiment, a client registers online with a central card authority or registers at a central card authority site. When registering, the client completes the fields of name entry 302, card account entry 304, user ID entry 306, and password entry 308. Card account entry 304, allows a client to input information regarding the purchasing card or discount card, that will link the central card authority system to the card company. CCS utility 140 (FIG. 1) is then capable of tracking interest rates, credit limits, available credit, reward points, current account balance, and other information associated with the specific card(s). Tracking account information allows CCS utility 140 to consider each of these factors when automatically selecting the "best" card to utilize for customer purchases.

In one embodiment, to automatically select the best card for completing a purchase, CCS utility 140 makes a number of comparisons. The comparisons are dependent on the client classification of card factors 330. In the illustrative embodiment, the client orders card factors 330a-f from least important to most important from consumer card selection GUI 300. For each purchase or financial transaction that utilizes the central card authority, CCS utility 140 analyzes the classified factors for each purchasing card, and makes the best selection based on the analysis of ordered card factors 330a-f. Other factors or classification techniques may be provided in other embodiments, and the classifications may be ties to the type of financial transaction that is being undertaken at the time. For example, a credit card may be selected above a debit card at a doctor's office. Also a first debit/credit card is selected at a particular retailer (e.g., AMEX card at COSTCO), and a second debit/credit card is selected at a cash disbursement machine (perhaps one without fees for cash withdrawal transactions).

Figure 4:
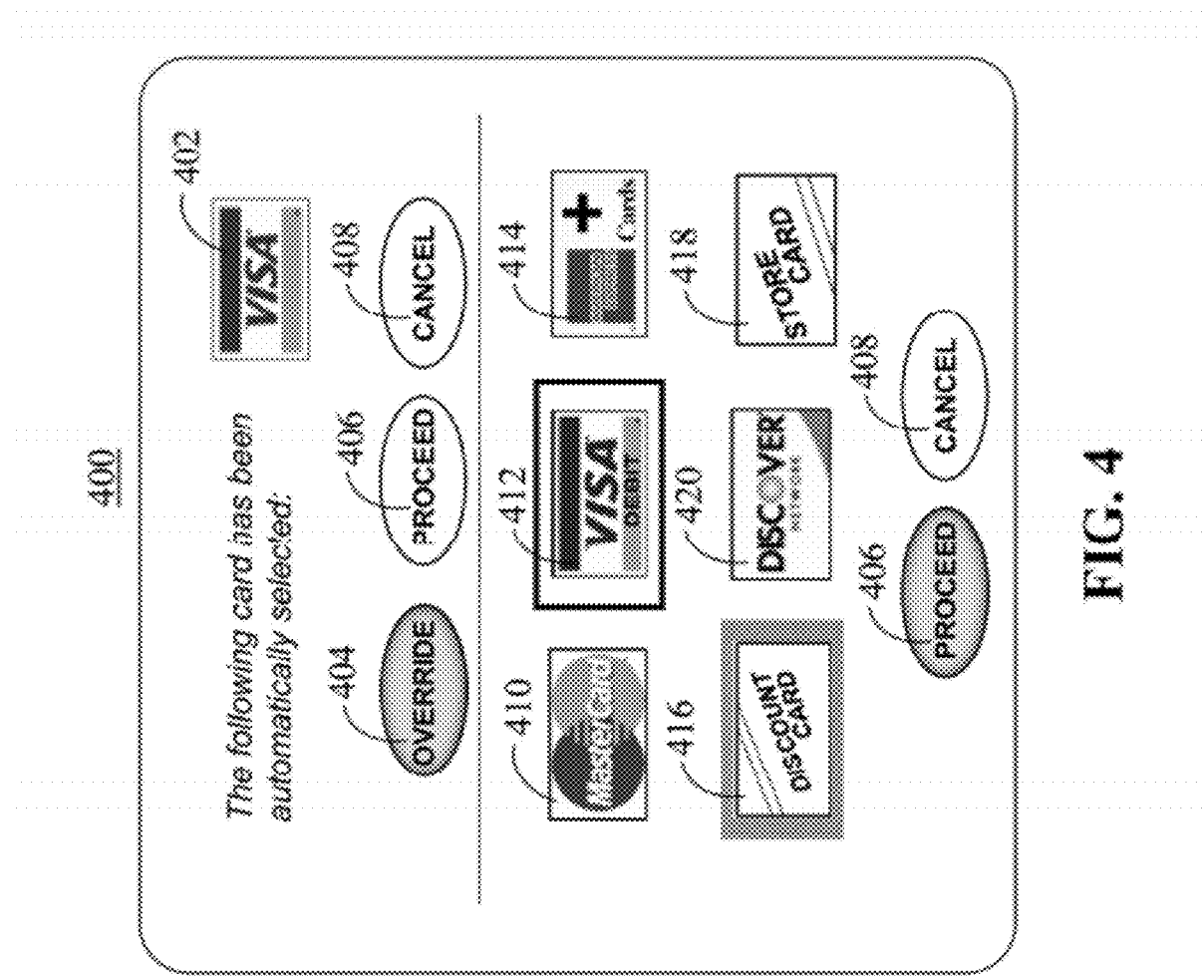
FIG. 4 is a graphical user interface with a display of available cards from which to choose a purchasing card, in accordance with one embodiment of the invention.

Cards registered with the central card authority may be utilized to make purchases, withdraw money, apply discounts, and other such transactions. FIG. 4 illustrates one embodiment in which CCS purchasing GUI 400 provides a selection of best card 402 (i.e., the card that is dynamically selected by CCS utility 140) from among the multiple additional cards 410-418. CCS purchasing GUI 400 also comprises selections override 404, proceed 406, and cancel 408. Within CCS purchasing GUI 400, credit card 410, override card 412, panic card 414, discount card 416, store card 418, and second credit card 420 may be selected during a purchase if override 404 is engaged by the client. In one embodiment, discount card 416 is displayed with a shaded background, illustrating the discount is automatically applied, unless otherwise instructed by the client.

In one embodiment, best card 402 is automatically selected by CCS utility 140. Override 404 is engaged by the client to overrule the card selection. After override 404 is engaged, the client may manually select the card of preference. Each card registered with the card authority is displayed; however, only the card name is displayed to identify the card. In one embodiment, panic card 414 may be selected to dynamically alert the police or security authorities when a client is in a panic situation, such as when being forced to make a purchase or withdraw money. After the card of interest has been selected, proceed 406 may be engaged to continue the purchasing process.

Figure 5:
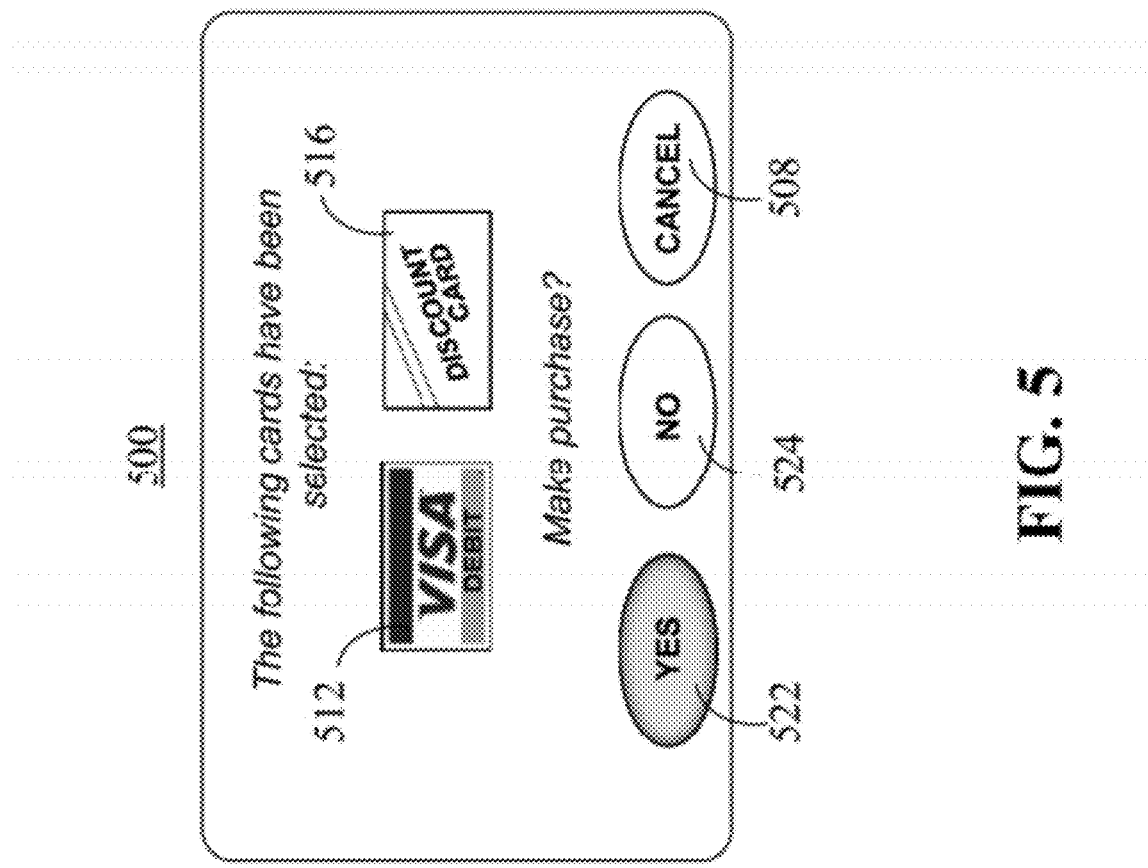
FIG. 5 is a graphical user interface with selectable options to complete a card purchase, according to one embodiment of the invention.

FIG. 5 illustrates final purchasing GUI 500. In one embodiment, final purchasing GUI 500 displays the cards selected for purchasing, namely override card 512 and discount card 516. The client may complete the purchase by engaging Yes 522. If No 524 is engaged, the display will return to CCS purchasing GUI 400, without completing the purchase. Cancel 508 terminates the purchase without completing the process.

Figure 6:
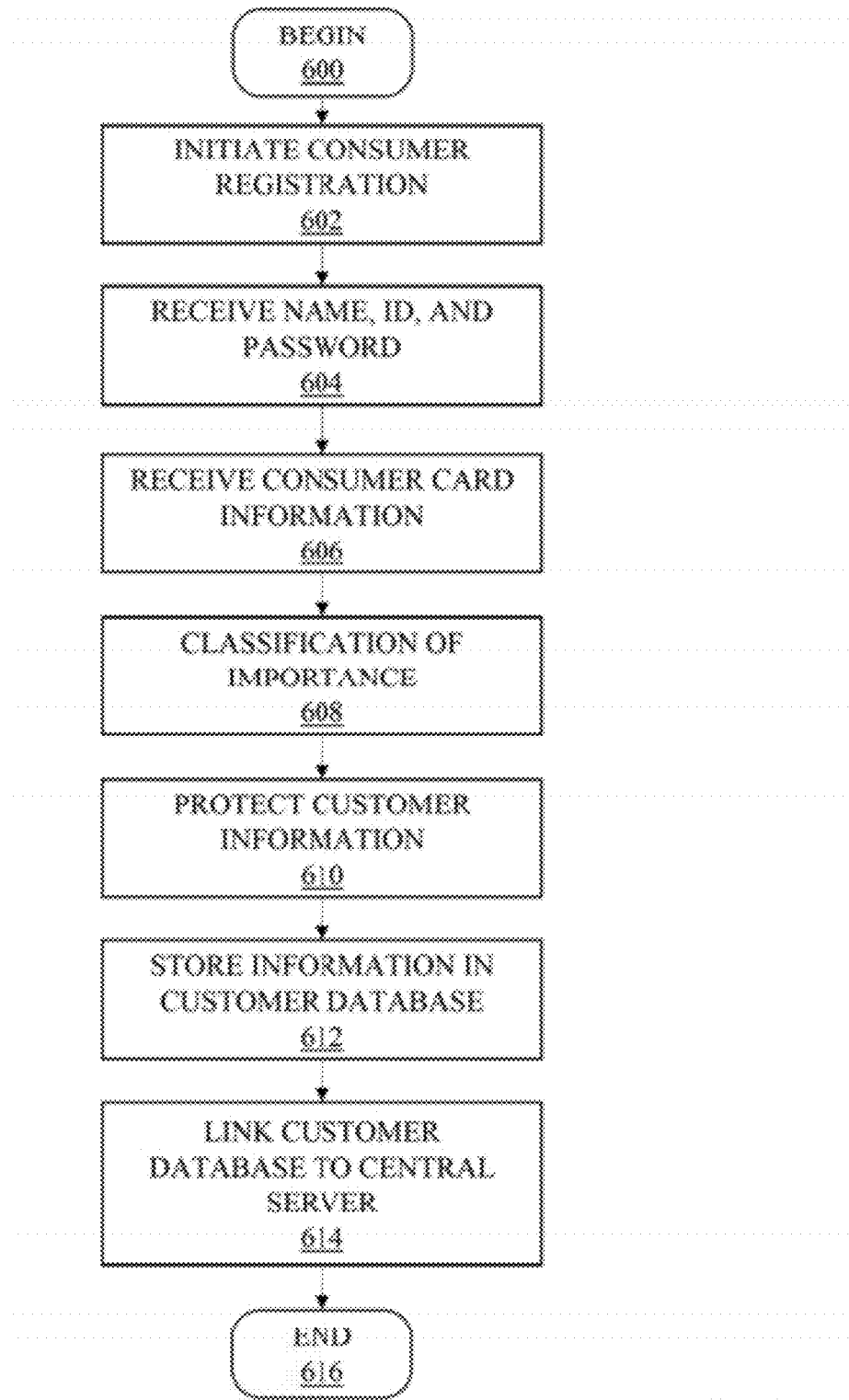
FIG. 6 is a logic flow chart of the process of consumer registration with a central card authority in accordance with one embodiment of the invention.
Figure 7:
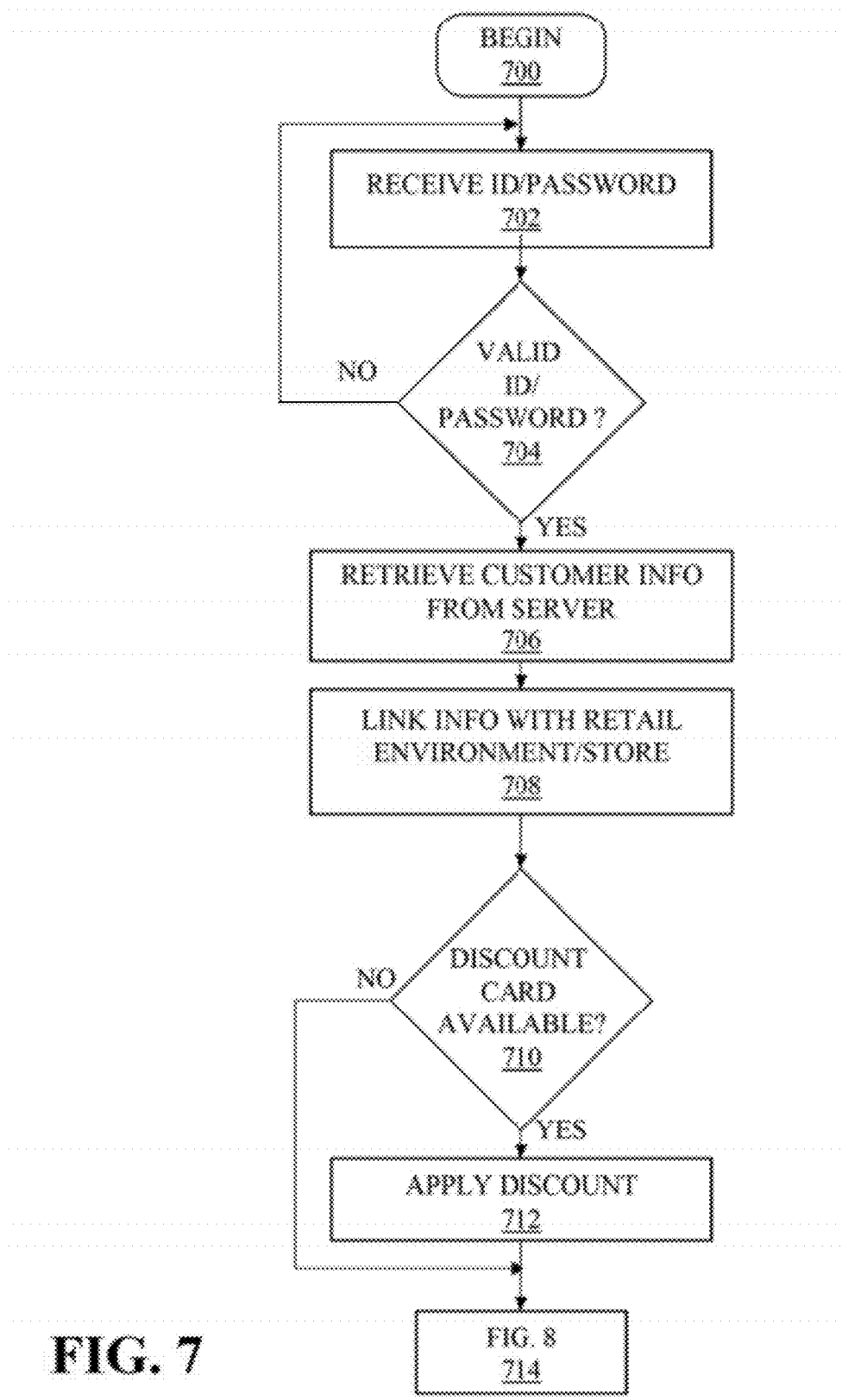
FIG. 7 is a logic flow chart of the process of retrieving and displaying purchasing cards according to one embodiment of the invention.
Figure 8:
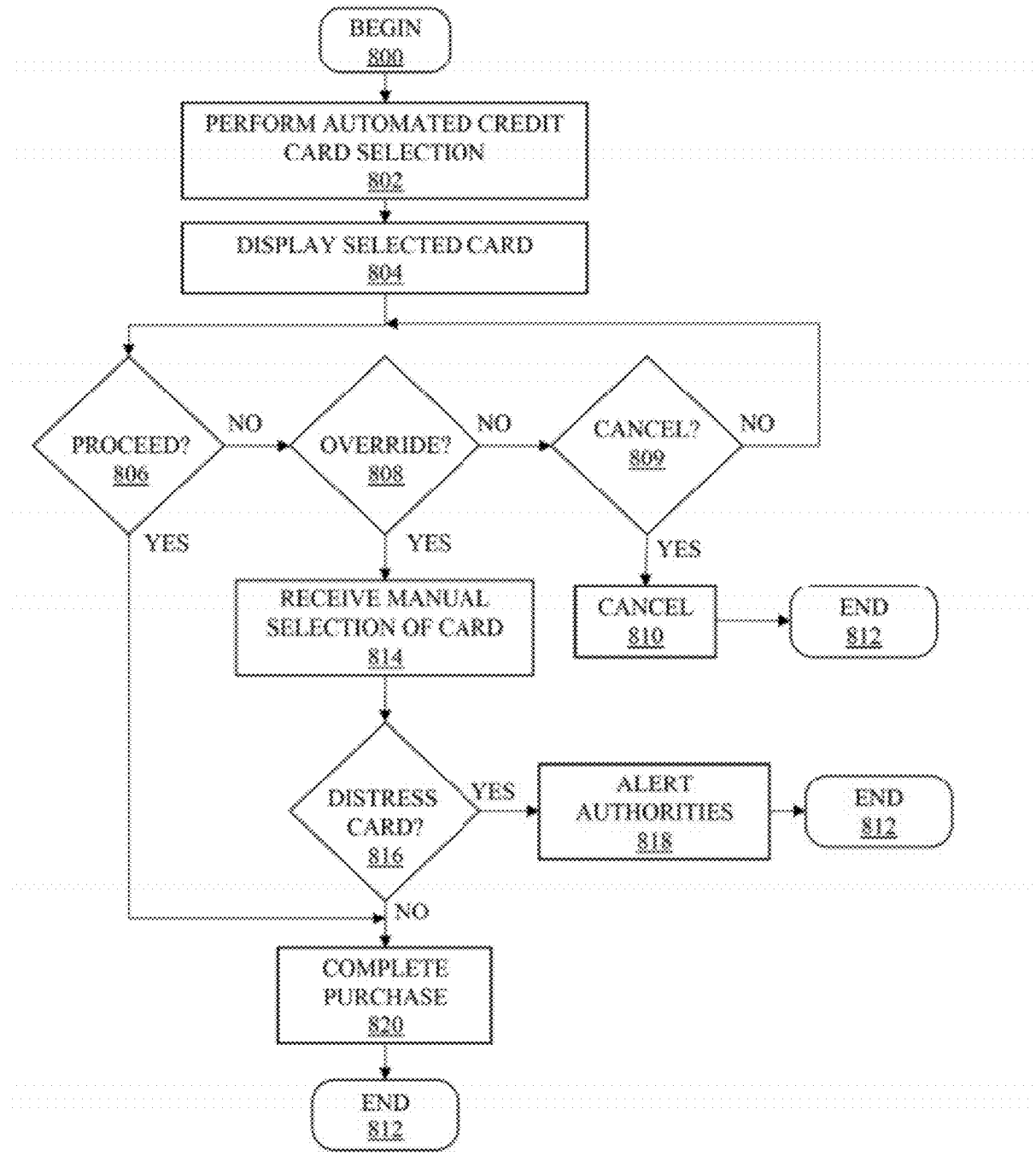
FIG. 8 is a logic flow chart of the process of completing a purchase utilizing a central credit card authority in accordance with one embodiment of the invention.

FIGS. 6-8 are flow charts illustrating various methods by which the above processes of the illustrative embodiments are completed. Specifically, the method of FIG. 6 relates to information provided by FIG. 3. The method of FIG. 7 relates to the process of retrieving customer information from the central card authority prior to a purchase. FIG. 8 illustrates the process of retrieving customer information from the central card authority during a purchase request. Although the methods illustrated in FIGS. 6-8 may be described with reference to components shown in FIGS. 1-5, it should be understood that this is merely for convenience and alternative components and/or configurations thereof can be employed when implementing the various methods. Key portions of the methods may be completed by CCS utility 140 executing within DPS 100 (FIG. 1) and controlling specific operations on DPS 100 which is an example central card authority server (200), and the methods are thus described from the perspective of both CCS utility 140 and DPS 100 or central card authority server 200.

The process of FIG. 6 begins at initiator block 600 and proceeds to block 602, at which the consumer registration is initiated. Initiating consumer registration with the central card authority may consist of displaying a GUI such as consumer card selection GUI 300 (FIG. 3). At block 604 the client's name, user ID, and password are received by CCS utility 140 (FIG. 3). Card information such as account number and account information is inputted for each card to be available through the central card authority, at block 606. At block 608, the classification of important factors to consider is received. Prior to storing the client registration information, the client data is protected, at block 610, possibly through encryption. The information is then stored on a customer database at block 614. The customer database is linked to a central server (central card authority server) at block 614, to be accessed by the client during purchasing. The process ends at block 616.

The FIG. 7 flow chart begins with block 700 where an attempt is made to access the central card authority server. The user's login credentials (e.g., user ID and password) are received at block 702. Before access to a client's account is granted, the user ID and password is validated. Therefore a decision is made at block 704, whether the user ID and password entered are valid. If the user ID and password are not valid, the process returns to block 702, where the user ID and password may be re-entered or blocked after a certain number of tries, to protect the customer database against forced cracking via trial and error. If the user ID and password are valid, the process continues to block 706. At block 706, the customer information is retrieved from the central card authority server.

After accessing the customer information from the central card authority server at block 706, the customer's purchasing information is linked with the retail store (or retail environment) at block 708. Linking the customer information with the retail store or retail environment is necessary in case a particular card should not be utilized with a particular store or environment, or if discounts are available at the retail store through a customer's stored discount cards. At block 710, a decision is made whether a discount card is available within the customer's account (at the central card authority server). If the discount card is available, the discount card is applied. Otherwise the process continues to FIG. 8, as indicated at block 714.

The process of FIG. 8 begins at block 800. At block 802 the automated purchasing card selection is performed by CCS utility 140 on the central card authority server. The selected purchasing card is displayed, at block 804, within CCS purchasing GUI 400 (FIG. 4). A decision is made at block 806, whether the customer selects the option to proceed with the purchasing process. If an input is received to proceed, the purchase is completed at block 820. If an input is not received to proceed, a decision is made at block 808, whether the user has selected the override option to override the choice for "best" purchasing card made by CCS utility 140. If a decision to override is not received, then a decision is made at block 809 whether to cancel the transaction. If the decision to cancel is selected, the process is cancelled at block 810, and the process ends at block 812.

If the decision to cancel is not selected, the graphical user interface continues to display the account information. However, the account access may time out after an specified period of time has elapsed without user input.

If an input is received to override the automated purchasing card selection, then the process continues to block 814 at which a manual card selection is received. At block 816, a decision is made whether the manual card selection received is a panic card. If the card selection received at block 814 is a panic card, the CCS utility triggers the generation of an alert at block 818. In one embodiment, the alert is forwarded to pre-programmed authorities (retail security team, police, etc.), who are alerted of the location of the panic card selection, customer name, and other relevant information. If a panic card is not selected, the process continues to block 820 where the purchase is completed utilizing the card selected. Then the process ends at block 812.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for enabling completion of purchase transactions on a data processing system, the method comprising:
the data processing system receiving a first credential that is linked to a customer account containing one or more pre-established electronic payment mechanisms; and
responsive to the data processing system authenticating the first credential, the data processing system:
accessing the customer account;
identifying a financial transaction;
in response to identifying the financial transaction, analyzing and comparing a plurality of ordered factors for each of the one or more pre-established electronic payment mechanisms, wherein each of the plurality of ordered factors for each pre-established electronic payment mechanism are ordered from most important to least important, and wherein the plurality of ordered factors include one or more of: an interest rate, a credit limit, an available credit, an amount of reward points, a current account balance, a credit type of account, a debit type of account, a discount account associated with the retail environment;

dynamically and automatically selecting one of the one or more pre-established electronic payment mechanisms as a best payment mechanism for providing an electronic payment for the financial transaction, wherein the best mechanism is selected based on a retail environment associated with the financial transaction and the analysis and comparison of the plurality of ordered factors for each of the one or more pre-established electronic payment mechanisms;

in response to determining a discount for the financial transaction is available by applying a discount card associated with the retail environment from a plurality of discount cards associated with the customer account, applying the discount card associated with the retail environment to the financial transaction, wherein the discount card is separate from the best payment mechanism; and outputting the selected best payment mechanism for use in completing an electronic payment for the financial transaction.

2. The method of claim 1 further comprising:

displaying a graphical user interface to receive one or more of a customer identifier (ID), database login credential information, payment access credential, and payment mechanism identifier (ID) and selection criteria;

receiving one or more of the customer identifier (ID), the database login credential information, the payment access credential, and the payment mechanism ID and selection criteria;

storing the received one or more of the customer ID, database login credential information, payment access credential, and the payment mechanism ID and selection criteria within a customer account maintained within a database; and assigning a unique login credential, including the customer ID and the database login credential, to the customer account within the database.

3. The method of claim 2, further comprising:

receiving a payment mechanism ID for an electronic payment mechanism to associated with the customer account, said payment mechanism ID identifying one of a payment mechanism that includes a credit card, a debit card, a discount card, and a phone card;

receiving a selection of one or more selection criteria to utilize when selecting the best payment mechanism, wherein the selection criteria enable a ranking of payment mechanisms and the plurality of ordered factors for each of the one or more pre-established electronic payment mechanisms based on a customer preference, a type of financial transaction, and purchasing factors attributable to the one or more pre-established electronic payment mechanisms; and storing the payment mechanism ID and selection criteria within the customer account.

4. The method of claim 1, further comprising:

on receipt of a new payment mechanism, validating that the new payment mechanism is a usable payment mechanism that is selectable for completing the electronic payment for the financial transaction;

wherein, in response to said new payment mechanism being one of a credit card and a debit card, said validating includes:

forwarding a payment mechanism ID and other information associated with the new payment mechanism to a verification company of the new payment mechanism; and receiving a validation response for the new payment mechanism;

automatically linking the new payment mechanism to the customer account;

dynamically updating information about the new payment mechanism within the customer account when updated information corresponding to the new payment mechanism is retrieved from the verification company.

5. The method of claim 1, further comprising:

enabling access to the database and to the customer account from a customer device within a location of the financial transaction, said location being a different physical location from a second location of the database, and wherein the customer device is connected to the database via one of a direct wired connection and a networked connection;

receiving, via a credential input mechanism associated with the customer device, a customer ID and a payment access credential for one of multiple customer accounts maintained on the database; and in response to the payment access credential being validated as belonging to the received customer ID, triggering a selection mechanism at the database to initiate the selection of the best payment mechanism, wherein access privilege to the customer account on the database is enabled via the customer device and credential input mechanism when the received payment access credential matches the payment access credential of the customer account identified by the customer ID.

6. The method of claim 1, wherein the credential information includes biometric information of a customer that is associated with the customer account, said method further comprising:

receiving biometric information at a credential input mechanism associated with a customer device within a location of the financial transaction, said location being a different physical location from a second location of the database, and wherein the customer device is connected to the database via one of a direct wired connection and a networked connection;

comparing the biometric information with stored biometric information within the database;

providing access to and triggering the selection mechanism to retrieve the best payment mechanism only when the biometric identification matches the stored biometric identification of the customer account;

receiving a selection of a second payment mechanism from the one or more pre-established electronic payment mechanisms within the customer account, wherein the selection of the second payment mechanism overrides the best payment mechanism;

replacing the best payment mechanism with the second payment mechanism; and completing the financial transaction with the second payment mechanism.

7. A computer program product comprising:

a non-transitory computer readable device; and program code on the computer readable device that when executed on a processing device provides the functions of:

receiving a first credential that is linked to a customer account containing one or more pre-established electronic payment mechanisms;

authenticating the first credential before providing access to the customer account, wherein access to the customer account and the electronic payment mechanisms maintained therein is only available responsive to the first credential being authenticated;

in response to authenticating the first credential: accessing the customer account; identifying a financial transaction; in response to identifying the financial transaction, analyzing and comparing a plurality of ordered factors for each of the one or more pre-established electronic payment mechanisms, wherein each of the plurality of ordered factors for each pre-established electronic payment mechanism are ordered from most important to least important, and wherein the plurality of ordered factors include one or more of: an interest rate, a credit limit, an available credit, an amount of reward points, a current account balance, a credit type of account, a debit type of account, a discount account associated with the retail environment;

dynamically and automatically selecting one of the one or more pre-established electronic payment mechanisms as a best payment mechanism for providing an electronic payment for the financial transaction, wherein the best mechanism is selected based on a retail environment associated with the financial transaction and the analysis and comparison of the plurality of ordered factors for each of the one or more pre-established electronic payment mechanisms;

in response to determining a discount for the financial transaction is available by applying a discount card associated with the retail environment from a plurality of discount cards associated with the customer account, applying the discount card associated with the retail environment to the financial transaction, wherein the discount card is separate from the best payment mechanism;

outputting the selected best payment mechanism for use in completing an electronic payment for the financial transaction;

receiving a selection of a second payment mechanism from the one or more pre-established electronic payment mechanisms within the customer account is received, wherein the selection of the second payment mechanism overrides the best payment mechanism; and in response to receiving the selection of the second payment mechanism:

replacing the best payment mechanism with the second payment mechanism; and completing the financial transaction with the second payment mechanism.

8. The computer program product of claim 7, wherein said program code further comprises code for:

displaying a graphical user interface to receive one or more of a customer identifier (ID), database login credential information, payment access credential, and payment mechanism identifier (ID) and selection criteria;

receiving one or more of the customer identifier (ID), the database login credential information, the payment access credential, and the payment mechanism ID and selection criteria;

storing the received one or more of the customer ID, database login credential information, payment access credential, and the payment mechanism ID and selection criteria within a customer account maintained within a database;

assigning a unique login credential, including the customer ID and the database login credential, to the customer account within the database; and receiving a payment mechanism ID for an electronic payment mechanism to associated with the customer account, said payment mechanism ID identifying one of a payment mechanism that includes a credit card, a debit card, a discount card, and a phone card.

9. The computer program product of claim 7, wherein said program code further comprises code for:

on receipt of a new payment mechanism, validating that the new payment mechanism is a usable payment mechanism that is selectable for completing the electronic payment for the financial transaction, wherein, when said new payment mechanism is one of a credit card and a debit card, said validating includes forwarding the payment mechanism ID and other information associated with the new payment mechanism to a verification company of the payment mechanism; and receiving a validation response for the new payment mechanism;

automatically linking the new payment mechanism to the customer account; and dynamically updating information about the new payment mechanism within the customer account when updated information corresponding to the new payment mechanism is retrieved from the verification company.

10. The computer program product of claim 7, wherein said program code further comprises code for:

receiving a selection of one or more selection criteria to utilize when selecting the best payment mechanism, wherein the selection criteria enable a ranking of payment mechanisms and the plurality of ordered factors for each of the one or more pre-established electronic payment mechanisms based on a customer preference, a type of financial transaction, and purchasing factors attributable to the one or more pre-established electronic payment mechanisms; and storing the payment mechanism ID and selection criteria within the customer account.

11. The computer program product of claim 7, wherein said program code further comprises code for:

enabling access to the database and to the customer account from a customer device within a location of the financial transaction, said location being a different physical location from a second location of the database, and wherein the customer device is connected to the database via one of a direct wired connection and a networked connection;

receiving, via a credential input mechanism associated with the customer device, a customer ID and a payment access credential for one of multiple customer accounts maintained on the database; and in response to validating the payment access credential as belonging to the received customer ID, triggering a selection mechanism at the database to initiate the selection of the best payment mechanism, wherein access privilege to the customer account on the database is enabled via the customer device and credential input mechanism when the received payment access credential matches the payment access credential of the customer account identified by the customer ID.

12. The computer program product of claim 7, wherein when the credential information includes biometric information of a customer that is associated with the customer account, said code further comprises code for:

receiving biometric information at a credential input mechanism associated with a customer device within a location of the financial transaction, said location being a different physical location from a second location of the database, and wherein the customer device is connected to the database via one of a direct wired connection and a networked connection;
comparing the biometric information with stored biometric information within the database; and
providing access to and triggering the selection mechanism to retrieve the best payment mechanism only when the biometric identification matches the stored biometric identification of the customer account.

13. A central card authority server comprising:
a processor;
a database having stored therein one or more customer accounts each having one or more electronic payment mechanisms that may be selected for completing a financial transaction;
a customer card selection (CCS) utility that executes on the processor to configure the server to:
  receive a first credential that is linked to a customer account containing one or more pre-established electronic payment mechanisms;
  authenticate the first credential before providing access to the customer account, wherein access to the customer account and the electronic payment mechanisms maintained therein is only available responsive to the first credential being authenticated;
  responsive to authenticating the first credential:
    access the customer account;
    identify a financial transaction;
    in response to identifying the financial transaction, analyze and compare a plurality of ordered factors for each of the one or more pre-established electronic payment mechanisms, wherein each of the plurality of ordered factors for each pre-established electronic payment mechanism are ordered from most important to least important;
    dynamically and automatically select one of one or more pre-established the electronic payment mechanisms as a best payment mechanism for providing an electronic payment for the financial transaction, wherein the best mechanism is selected based on a retail environment associated with the financial transaction and the analysis and comparison of the plurality of ordered factors for each of the one or more pre-established electronic payment mechanisms;
    in response to determining a discount for the financial transaction is available by applying a discount card associated with the retail environment from a plurality of discount cards associated with the customer account, apply the discount card associated with the retail environment to the financial transaction, wherein the discount card is separate from the best payment mechanism;
    output the selected best payment mechanism for use in completing an electronic payment for the financial transaction;
    receive a selection of a second payment mechanism from the one or more pre-established electronic payment mechanisms within the customer account is received, wherein the selection of the second payment mechanism overrides the best payment mechanism; and
    in response to receiving the selection:
      replace the best payment mechanism with the second payment mechanism selected; and
      complete the financial transaction with the second payment mechanism selected.

14. The central card authority server of claim 13, wherein said CCS utility further configures the server to:
  display a graphical user interface to receive one or more of a customer identifier (ID), database login credential information, payment access credential, and payment mechanism identifier (ID) and selection criteria;
  receive one or more of the customer identifier (ID), the database login credential information, the payment access credential, and the payment mechanism ID and selection criteria;
  store the received one or more of the customer ID, database login credential information, payment access credential, and the payment mechanism ID and selection criteria within a customer account maintained within a database;
  assign a unique login credential, including the customer ID and the database login credential, to the customer account within the database; and
  receive a payment mechanism ID for an electronic payment mechanism to associated with the customer account, said payment mechanism ID identifying one of a payment mechanism that includes a credit card, a debit card, a discount card, and a phone card.

15. The central card authority server of claim 13, said CCS utility further configures the server to:
  on receipt of a new payment mechanism, validate that the new payment mechanism is a usable payment mechanism that is selectable for completing the electronic payment for the financial transaction, wherein, when said new payment mechanism is one of a credit card and a debit card, said validate that the new payment mechanism is a usable payment mechanism includes forwarding the payment mechanism ID and other information associated with the new payment mechanism to a verification company of the new payment mechanism; and receiving a validation response for the new payment mechanism;
  automatically link the new payment mechanism to the customer account;
  dynamically update information about the new payment mechanism within the customer account when updated information corresponding to the new payment mechanism is retrieved from the verification company;
  receive a selection of one or more selection criteria to utilize when selecting the best payment mechanism, wherein the selection criteria enable a ranking of payment mechanisms and the plurality of ordered factors for each of the one or more pre-established electronic payment mechanisms based on a customer preference, a type of financial transaction, and purchasing factors attributable to the one or more pre-established electronic payment mechanisms; and
  store the payment mechanism ID and selection criteria within the customer account.

16. The central card authority server of claim 13, said CCS utility further configures the server to:
  enable access to the database and to the customer account from a customer device within a location of the financial transaction, said location being a different physical location from a second location of the database, and wherein the customer device is connected to the database via one of a direct wired connection and a networked connection;
  receive, via a credential input mechanism associated with the customer device, a customer ID and a payment access credential for one of multiple customer accounts maintained on the database; and in response to validating the payment access credential as belonging to the received customer ID, trigger a selection mechanism at the database to initiate the selection of the best payment mechanism, wherein access privilege to the customer account on the database is enabled via the customer device and credential input mechanism when the received payment access credential matches the payment access credential of the customer account identified by the customer ID.

17. The central card authority server of claim 13, said CCS utility further configures the server to, in response to the credential information including biometric information of a customer that is associated with the customer account:

receive biometric information at a credential input mechanism associated with a customer device within a location of the financial transaction, said location being a different physical location from a second location of the database, and wherein the customer device is connected to the database via one of a direct wired connection and a networked connection;

compare the biometric information with stored biometric information within the database; and provide access to and triggering the selection mechanism to retrieve the best payment mechanism only when the biometric identification matches the stored biometric identification of the customer account;

wherein the plurality of ordered factors include one or more of: an interest rate, a credit limit, an available credit, an amount of reward points, a current account balance, a credit type of account, a debit type of account, a discount account associated with the retail environment.

18. The method of claim 6, wherein the second payment mechanism is a panic card for triggering a distress call, the method further comprising:

in response to determining the selected second payment mechanism is a panic card, generating an alert that indicates that a customer associated with the second payment mechanism is in a panic situation and is being forced to make a purchase or withdraw money, wherein the alert further comprises a location of the panic card selection and a name of the customer; and dynamically forwarding the alert to at least one of one or more preprogrammed authorities, wherein the one or more preprogrammed authorities include: police, a retail security team, or security authorities.

19. The computer program product of claim 7, wherein the second payment mechanism is a panic card for triggering a distress call, said program code further comprises code for:

in response to determining the selected second payment mechanism is a panic card, generating an alert that indicates that a customer associated with the second payment mechanism is in a panic situation and is being forced to make a purchase or withdraw money, wherein the alert further comprises a location of the panic card selection and a name of the customer; and dynamically forwarding the alert to at least one of one or more preprogrammed authorities, wherein the one or more preprogrammed authorities include: police, a retail security team, or security authorities.

20. The central card authority server of claim 13, wherein the second payment mechanism is a panic card for triggering a distress call, and wherein said CCS utility further configures the server to:

in response to determining the selected second payment mechanism is a panic card, generate an alert that indicates that a customer associated with the second payment mechanism is in a panic situation and is being forced to make a purchase or withdraw money, wherein the alert further comprises a location of the panic card selection and a name of the customer; and dynamically forward the alert to at least one of one or more preprogrammed authorities, wherein the one or more preprogrammed authorities include: police, a retail security team, or security authorities.

* * * * *